UNITED STATES PATENT OFFICE

2,350,900

AMINO DIPHENYL SULPHIDES AND PROCESS OF MAKING THEM

Treat Baldwin Johnson, Bethany, Conn., assignor to Sharp & Dohme, Incorporated, Philadelphia, Pa., a corporation of Maryland No Drawing. Application September 11, 1937, Serial No. 163,495

8 Claims. (Cl. 260—578)

This invention relates to the production of phenyl aminophenyl sulphides. It relates more particularly to a process by which phenyl aminophenyl sulphides are produced by the rearrangement of phenyl-sulphenanilides; and it includes not only this new process, but certain intermediates, that is, new phenyl sulphenanilides advantageously used in the process, as well as new phenyl aminophenyl sulphides.

In its broader aspects, the process of the invention includes the rearrangement of compounds having an SNH linkage between aromatic nuclei with the formation of aminophenyl sulphides, according to the type equation:

This rearrangement is effected by subjecting the sulphenanilides to a relatively high temperature, or by subjecting them to a high temperature in the presence of an aromatic amine, which may be the same as that from which the anilide nucleus of the sulphenanilide is derived, or may be different. In general, substituents in either of the benzene nuclei of the sulphenanilide do not have any material effect or influence on the molecular rearrangement so long as there is at least a para or an ortho position open in the anilide nucleus. The rearrangement tends to proceed in such a manner as to result in the formation of the p-aminophenyl sulphide; but if the para position is occupied, the o-aminophenyl sulphide is formed.

If, in carrying out this reaction, the sulphenanilide is heated in an excess of an aromatic amine other than that which corresponds to the anilide nucleus in the sulphenanilide, the final sulphide produced is generally that which corresponds to the added aromatic amine used in the process; in other words, there is a substitution of the aromatic amine used for the anilide group in the original molecule. For example, if 2-nitro-benzene-sulphenanilide be heated with an excess of o-toluidine, 2-nitrophenyl-3'-methyl-4'-aminophenyl sulphide is formed, rather than the 2-nitrophenyl-4'-aminophenyl sulphide which would correspond to the sulphenanilide taken. In such processes, aniline, o-toluidine and p-toluidine readily displace each other from the respective sulphenanilide molecule with the production of corresponding aminophenyl sulphides. There are exceptions to this usual displacement, however. o-chloraniline will not displace the anilide group or the toluidide group from benzene sulphenanilides, but if such sulphenanilides are heated with an excess of o-chloraniline the same rearrangement takes place as if no aromatic amine were used, and the aminophenyl sulphide obtained is that corresponding to the original sulphenanilide. Per contra, the o-chloranilide group, when present in the sulphenanilide molecule, is easily displaced by other amines when heated with an excess thereof, 2-nitrobenzene-sulphen-o-chloranilide giving 2-nitrophenyl-4'-aminophenyl sulphide when heated with an excess of aniline. Similar transformations occur when the sulphen-o-chloranilide is heated with an excess of a toluidine.

From the standpoint of new intermediates, the invention includes new chlorinated nitrobenzenesulphenanilides, which may be readily prepared by reacting a nitrobenzene sulphenyl chloride with a chloraniline, or by reacting a chlornitrobenzene sulphenyl chloride with an aromatic amine, usually in the presence of a solvent such as anhydrous ether. This production of the new intermediates will be illustrated by the following example, showing the production of 2-nitrobenzene-sulphen-o-chloranilide.

*Example 1.*—o-Nitrophenyl-sulphenyl-chloride is prepared by allowing gaseous chlorine to react with o,o'-dinitrodiphenyldisulphide in ice-cold anhydrous chloroform. The sulphenyl chloride is then allowed to react with o-chloraniline in excess, using anhydrous ether as a solvent. The product, 2-nitrobenzene-sulphen-o-chloranilide, is obtained by evaporating the ether and after removing the o-chloranilin hydrchloride by filtration is recrystallized from alcohol. It melts at 130° C.

Among the other new chlorinated sulphen compounds which may be readily prepared in the same manner and which are included as new intermediates are 2,4-nitrobenzene-sulphen-o-chloranilides and 4-nitrobenzene-sulphen-o-chloranilides.

All of these new intermediates, and a number of other intermediates, some of which have been previously known and some of which are new, are useful in the process of the invention for the production of the new nitrophenyl aminophenyl sulphides. The new nitrophenyl aminophenyl sulphides include such sulphides in which one or the other of the benzene nuclei is substituted by a methyl group or by a halogen. The compounds in which the aminophenyl nucleus is substituted with a methyl group or a halogen are produced by the treatment of nitrophenyl-sulphen-toluidides or nitrophenyl-sulphen-halo-anilides, or the like, whereas the compounds in which the nitrophenyl nucleus has a halogen or other substituent are produced from the nitrochlorphenylsulphen-anilides or other derivatives. Of course, both of the benzene nuclei may have substituents other than the nitro group and the amino group, such compounds as nitrochlorophenyl-methylaminophenyl sulphides being included, as well as the compounds in which either the halogen or methyl group of this compound is not present.

Insofar as the new process is concerned, the rearrangement takes place when the sulphenanilide is heated, e. g., to temperatures in the neighborhood of 150–160° C., or higher, or is heated in the presence of an aromatic amine, advantageously to 180–190° C., so long as the anilide nucleus has either a para or an ortho position open.

The process and a number of the new products will be illustrated by the following examples, although it is to be understood that the invention is not limited thereto.

*Example 2.*—o-Nitrophenyl sulphenanilide is heated on an oil bath for five hours at 150–160° C. with occasional stirring. The resulting black oily liquid is cooled and treated with dilute hydrochloric acid by warming on a steam bath for 30 minutes, with the formation of a dark colored crystalline solid. This solid dissolves in part, and by filtering and cooling the acid solution, a small quantity of glistening prismatic crystals is obtained. This is the hydrochloride salt of 2-nitrophenyl-4'-aminophenyl sulphide, M. P. 225° C. The solution is made faintly alkaline with 10% sodium hydroxide solution and by recrystallizing several times from alcohol, a bright yellow crystalline solid, 2-nitrophenyl-4'-aminophenyl sulphide, is obtained. It has a melting point of 106° C. It is soluble in ordinary organic solvents, and when dissolved in ether forms the hydrochloride with a small amount of concentrated hydrochloric acid.

*Example 3.*—p-Nitrophenyl sulphanilide when treated as in Example 2 yields a product which is quite soluble in hot dilute hydrochloric acid, although much darker and somewhat more difficult to purify than the product of Example 2. It is 4-nitrophenyl-4'-aminophenyl sulphide, and is a yellow crystalline solid crystallizable from warm alcohol. It melts at 140–141° C. Its hydrochloride salt is a colorless crystalline solid, M. P. 200° C.

*Example 4.*—o-Nitrophenyl-sulphen-p-toluidide when treated as in Example 2 rearranges to form 2-nitrophenyl-5'-methyl-2'-aminophenyl sulphide, which crystallizes from alcohol as an orange-red solid, M. P. 108° C. Its hydrochloride salt is difficultly soluble in water, forming slightly greenish crystals, M. P. 190° C.

*Example 5.*—10 parts of o-nitrophenyl-sulphen-o-toluidide are suspended in 20 parts of o-toluidine. The mixture is heated on an oil bath under a reflux condenser for six hours at 180–190° C. A complete solution takes place. The mixture is then either cooled and 5 parts of 20% sodium hydroxide solution are added, or the excess of o-toluidine is removed by pouring the warm mixture after heating into a cold solution of dilute hydrochloric acid. The o-toluidine forms a hydrochloric acid salt which is readily dissolved, whereas the hydrochloride of the amino sulphide is insoluble and can be readily separated by filtration. It is purified by dissolving in alcohol and decolorizing by digestion with a decolorizing agent, after which the solution is made slightly alkaline with 10% sodium hydroxide and further decolorized. Upon cooling, a yellow crystalline substance, 2-nitrophenyl-3'-methyl-4'-aminophenyl sulphide, M. P. 101–103° C., is obtained.

*Example 6.*—o-Nitrophenyl-sulphen-p-toluidide when treated with p-toluidine as in the preceding example yields 2-nitrophenyl-5'-methyl-2'-aminophenyl sulphide, M. P. 106–108° C.

*Example 7.*—2,4-nitrochlorbenzene-sulphenanilide is heated for six hours at 150–160° C. as in Example 2. The product obtained, when recrystallized from alcohol, is 2,4-nitrochlorophenyl-4'-aminophenyl sulphide, M. P. 127–129° C. It is easily soluble in ordinary organic solvents. Its hydrochloride, difficultly soluble in water, is obtained in crystalline form by dissolving the free base in ether and slowly adding concentrated hydrochloric acid. It melts at 215–225° C.

This sulphide is obtained with better results by heating 2,4-nitrochlorobenzene sulphenanilide with an excess of aniline, e. g., 10 parts of the sulphenanilide with 20 parts of aniline, at about 180–190° C. for six hours.

*Example 8.*—10 parts of 2,4-nitrochlorobenzene-sulphen-o-toluidide are heated with 15 parts of o-toluidine, with the production of 2,4-nitrochlorophenyl-3'-methyl-4'-aminophenyl sulphide, which on purification from alcohol after digestion with a decolorizing agent, is obtained as bright yellow prisms, M. P. 113–115° C. Its hydrochloride has a melting point of 215–220° C.

*Example 9.*—4-nitrobenzene-sulphen-o-chloroanilide is heated with an excess of boiling o-chloro-aniline. The resulting product is purified by dissolving in a mixture of ether and petroleum ether, boiling with a decolorizing agent and slowly evaporating. It is 4-nitrophenyl-3'-chloro-4'-aminophenyl sulphide, forming yellow crystals, M. P. 127–129° C. The free base is readily soluble in ether and gives a colorless crystalline hydrochloride.

*Example 10.*—A number of 2-nitrobenzene-sulphenanilides were heated with an excess of an aromatic amine other than that corresponding to the amine from which the anilide nucleus was derived at about 180–190° C., and the resulting products isolated and purified as in the preceding examples. The results are shown in the following table:

| Sulphenanilide | Amine | Sulphide |
| --- | --- | --- |
| 2-nitrobenzene-sulphenanilide | o-Toluidine | 2-nitrophenyl-3'-methyl-4'-amino-phenyl sulphide. |
| Do | p-Toluidine | 2-nitrophenyl-5'-methyl-2'-amino-phenyl sulphide. |
| 2-nitrobenzene-sulphen-o-toluidide | Aniline | 2-nitrophenyl-3'-amino-phenyl sulphide. |
| Do | p-Toluidine | 2-nitrophenyl-5'-methyl-2'-amino-phenyl sulphide. |
| 2-nitrobenzene-sulphen-p-toluidide | Aniline | 2-nitrophenyl-4'-amino-phenyl sulphide. |
| Do | o-Toluidine | 2-nitrophenyl-3'-methyl-4'-amino-phenyl sulphide. |
| 2-nitrobenzene-sulphen-o-chloroanilide | do | Do. |
| Do | p-Toluidine | 2-nitrophenyl-5'-methyl-2'-amino-phenyl sulphide. |
| 2-nitrobenzene-sulphenanilide | o-Chloroaniline | 2-nitrophenyl-4'-amino-phenyl sulphide. |
| 2-nitrobenzene-sulphen-o-toluidide | do | 2-nitrophenyl-3'-methyl-4'-amino-phenyl sulphide. |
| 2-nitrobenzene-sulphen-p-toluidide | do | 2-nitrophenyl-5'-methyl-2'-amino-phenyl sulphide. |

In each case, it will be noted that where a sulphenanilide was heated with a toluidine or aniline, the rearranged product corresponded to the toluidine or aniline; whereas when heated with o-chloroaniline, the rearranged product corresponded to the original sulphenanilide.

It will thus be seen that the present invention provides a new process by which aminophenyl sulphides may be produced, which simply involves heating a benzene-sulphen-anilide either alone or in the presence of an aromatic amine. The invention includes not only this new process, but also certain new intermediates, namely, the halogenated nitrobenzene-sulphen-anilides, as well as a new series of diphenyl sulphide derivatives, namely, phenyl aminophenyl sulphides, in which at least one of the phenyl groups is further substituted by a halogen or a methyl group.

I claim:

1. The process of preparing amino diphenyl sulphides which comprises rearranging a phenyl-sulphen-anilide by heating it to a temperature, below that at which pyrolytic decomposition takes place but sufficiently high to cause rearrangement.

2. The process of preparing amino diphenyl sulphides which comprises rearranging a phenyl-sulphen-anilide by heating it to a relatively high temperature above about 150° C., below that at which pyrolytic decomposition takes place.

3. The process of preparing amino diphenyl sulphides which comprises rearranging a phenyl-sulphen-anilide by heating it to a temperature below that at which pyrolytic decomposition takes place but sufficiently high to cause rearrangement in the presence of an aryl amine.

4. The process of preparing amino diphenyl sulphides which comprises rearranging a phenyl-sulphen-anilide by heating it to a temperature below that at which pyrolytic decomposition takes place but sufficiently high to cause rearrangement in the presence of an aromatic amine corresponding to the anilide group of the phenyl-sulphen-anilide.

5. The process of preparing amino diphenyl sulphides which comprises rearranging a nitro-phenyl-sulphen-anilide by heating to a temperature, below that at which pyrolytic decomposition takes place but sufficiently high to cause rearrangement.

6. The process of preparing amino diphenyl sulphides which comprises rearranging a nitro-phenyl-sulphen-anilide by heating to a relatively high temperature above about 150° C., below that at which pyrolytic decomposition takes place.

7. The process of preparing amino diphenyl sulphides which comprises rearranging a nitro-phenyl-sulphen-anilide by heating to a temperature below that at which pyrolytic decomposition takes place but sufficiently high to cause rearrangement in the presence of an aromatic amine corresponding to the anilide group of the nitrophenyl-sulphen-anilide.

8. The process of preparing amino diphenyl sulphides which comprises rearranging a nitro-phenyl-sulphen-anilide by heating to a temperature below that at which pyrolytic decomposition takes place but sufficiently high to cause rearrangement in the presence of an aryl amine.

TREAT BALDWIN JOHNSON.